Patented Jan. 19, 1937

2,068,313

UNITED STATES PATENT OFFICE 2,068,313

COMPOUNDS OF THE ANTHRAQUINONE SERIES AND PROCESS FOR PRODUCING THE SAME

William Dettwyler, Milwaukee, Wis., assignor to E. I. du Pont de Nemours & Company, Wilmington, Del., a corporation of Delaware No Drawing. Original application May 24, 1933, Serial No. 672,641. Divided and this application October 21, 1935, Serial No. 45,970

5 Claims. (Cl. 260—60)

This invention relates to the preparation of new and valuable compounds of the anthraquinone series and more particularly to the preparation of dihalogen-tetra-acidylamino-1,1'-dianthraquinonyls. This application is a division of U. S. application Ser. No. 672,641, filed May 24, 1933.

It is an object of this invention to prepare new and useful dyestuff intermediates of the anthraquinone series which have been found to be particularly useful in the preparation of flavanthrone dithiazoles, although their use is obviously not limited thereto.

According to the present invention, an α,α-dihalogen-β,β-diacylamino-anthraquinone, such as for example 1,5,2,6- or 1,8,2,7-dihalogen-dibenzoylamino-anthraquinone is subjected to condensation in the presence of a copper catalyst to produce the corresponding dihalogen-tetrabenzoylamino - 1,1' - dianthraquinonyl. This compound, it has been found, may be subjected to simultaneous hydroylsis and ring closure to give the corresponding α,α'-dihalogen β,β'-diamino-flavanthrone as more particularly described in the parent application above referred to.

Without limiting my invention to any particular procedure, the following examples are given to illustrate my specific mode of operation. Parts mentioned are by weight.

Step 1.—Preparation of the initial material 750 parts of dry nitrobenzene and 75 parts of 1,5 - dichloro - 2,6 - diamino - anthraquinone are heated together to 170° C. and to this solution 75 parts of benzoyl chloride are added slowly, while maintaining a uniform temperature. The mass is then heated to 190° C. and held at this temperature for two hours. The 1,5-dichloro-2,6-di(benzoylamino)-anthraquinone thus produced crystallizes out in yellow needles. The charge is then cooled to 30–40° C. and filtered, and the cake is washed with nitrobenzene and alcohol, and finally dried in the usual manner.

Step 2.—Preparation of the first intermediate 800 parts of dry nitrobenzene, 100 parts of 1,5-dichloro - 2,6 - dibenzoyl - diamino-anthraquinone, 40 parts of copper powder, and 2 parts of soda ash are heated together to reflux temperature and held at this temperature about 20 hours. The color of the suspension changes from yellow to olive. The mass is now cooled to 20° C., and filtered. The filter cake is washed successively with nitrobenzene, alcohol, and hot water. The wet cake is suspended in 1000 parts of water, 100 parts of concentrated sulfuric acid and 50 parts of common salt are added, and the mass is warmed to 50° C. About 20 parts of sodium chlorate are then added gradually, until a distinct excess of chlorine is produced. After a further half hour at this temperature, the mass is filtered, and the filter cake is washed free of acid and dried as usual. The product is most probably 5,5'-dichloro-2,6,2',6'-tetrabenzoyl-tetramino - 1,1' - dianthraquinonyl, of the formula:

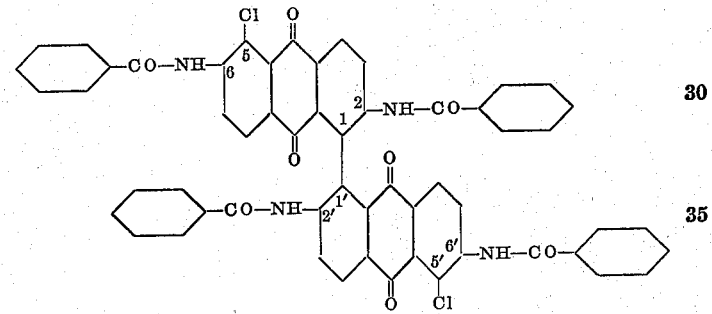

In dry state it has the form of short olive needles, practically insoluble in nitrobenzene, but soluble in concentrated sulfuric acid with a greenish-yellow color.

1,8-dichloro-2,7-diamino-anthaquinone may be used in place of 1,5-dichloro-2,6-diamino-anthraquinone specifically mentioned in the above example. Other acidylamino - anthraquinones such as the corresponding diacetyl-diamino-anthraquinone compounds may be used in place of the dibenzoylamino-anthraquinones, for instance 1,5 - dichloro-2,6-diacetyl-diamino-anthraquinone prepared in known manner from 1,5-dichloro-2,6-diamino-anthraquinone and acetic anhydride may be subjected to condensation to give the corresponding dichloro-tetraacetylamino-1,1'-dianthraquinonyl.

It will be understood that many variations and modifications are possible in my preferred procedure without departing from the spirit of this invention.

I claim:

1. The process which comprises heating an α,α-dihalogen-β,β-diacylamino-anthraquinone in which one halogen and one acylamino group are attached to each benzene nucleus of the anthraquinone molecule in ortho position to each other in an inert organic medium and in the presence of a copper catalyst to produce dihalogen-tetraacyl-tetramino-1,1'-dianthraquinonyl.

2. The process which comprises heating 1,5-dichloro-2,6-dibenzoyl-diamino-anthraquinone in an inert organic medium and in the presence of of a copper catalyst to produce 5,5'-dichloro-2,6,2',6' - tetrabenzoyl-tetramino - 1,1' - dianthraquinonyl.

3. An α,α'-dihalogen-tetra-β-acylamino-1,1'-dianthraquinonyl in which one acylamino group is attached to each anthraquinone molecule ortho to the dianthraquinonyl linkage, and in which one halogen and one acylamino group are attached in ortho position to each other in the benzene ring of each anthraquinone molecule remote from the dianthraquinonyl linkage.

4. 5,5'-dichloro-2,6,2',6'-tetraacyl - tetramino-1,1'-dianthraquinonyl.

5. 5,5'- dichloro - 2,6,2',6'- tetrabenzoyl - tetramino-1,1'- dianthraquinonyl.

WILLIAM DETTWYLER.